United States Patent
Kajita

(10) Patent No.: US 11,366,315 B2
(45) Date of Patent: Jun. 21, 2022

(54) IMAGE PROCESSING APPARATUS, METHOD FOR CONTROLLING THE SAME, NON-TRANSITORY COMPUTER-READABLE STORAGE MEDIUM, AND SYSTEM

(71) Applicant: CANON KABUSHIKI KAISHA, Tokyo (JP)

(72) Inventor: Yoshiki Kajita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/004,379

(22) Filed: Aug. 27, 2020

(65) Prior Publication Data
US 2021/0063732 A1    Mar. 4, 2021

(30) Foreign Application Priority Data
Aug. 30, 2019    (JP) .............................. JP2019-158929

(51) Int. Cl.
*G02B 27/00*    (2006.01)
*G02B 27/01*    (2006.01)
*G06T 19/00*    (2011.01)

(52) U.S. Cl.
CPC ..... *G02B 27/0025* (2013.01); *G02B 27/0093* (2013.01); *G02B 27/0172* (2013.01); *G02B 2027/011* (2013.01); *G02B 2027/0138* (2013.01); *G06T 19/006* (2013.01)

(58) Field of Classification Search
CPC ............ G02B 27/0172; G02B 27/0025; G02B 27/0093; G02B 2027/0178; G02B 2027/011; G02B 2027/0138; G02B 27/017; G02B 27/0179; G02B 27/0101; G02B 27/01; G02B 27/00; G02B 2027/014; G02B 2027/0141; G02B 2027/0145; G02B 2027/0185; G06T 19/006

See application file for complete search history.

(56) References Cited

U.S. PATENT DOCUMENTS

| | | | | |
|---|---|---|---|---|
| 2008/0055193 | A1* | 3/2008 | Tsuyuki ................. | G02B 27/46 345/7 |
| 2008/0198097 | A1* | 8/2008 | Ishino .................. | G02B 27/017 345/8 |
| 2010/0090929 | A1* | 4/2010 | Tsujimoto ............... | G06T 5/006 345/7 |

(Continued)

FOREIGN PATENT DOCUMENTS

JP    2005109877 A    4/2005

*Primary Examiner* — Xuemei Zheng
(74) *Attorney, Agent, or Firm* — Rossi, Kimms & McDowell LLP

(57) ABSTRACT

This invention provides an image processing apparatus configured to communicate with a head mounted display, which comprises a display device and an optical system for imaging an image displayed on the display device in relation to a user's eyes, and to generate image data for displaying on the display device of the head mounted display, wherein the image processing apparatus comprises a generating unit configured to generate image data for displaying on the display device, and an image processing unit configured to, with regard to the image data generated by the generating unit, in relation to inside a visible area of the optical system, perform image processing for correcting a deterioration of image quality by the optical system.

20 Claims, 12 Drawing Sheets

(56) References Cited

U.S. PATENT DOCUMENTS

2010/0091027 A1* 4/2010 Oyama .............. G02B 27/0068
  345/581
2017/0307879 A1* 10/2017 Saiga ...................... G06F 3/147

* cited by examiner

FIG. 6
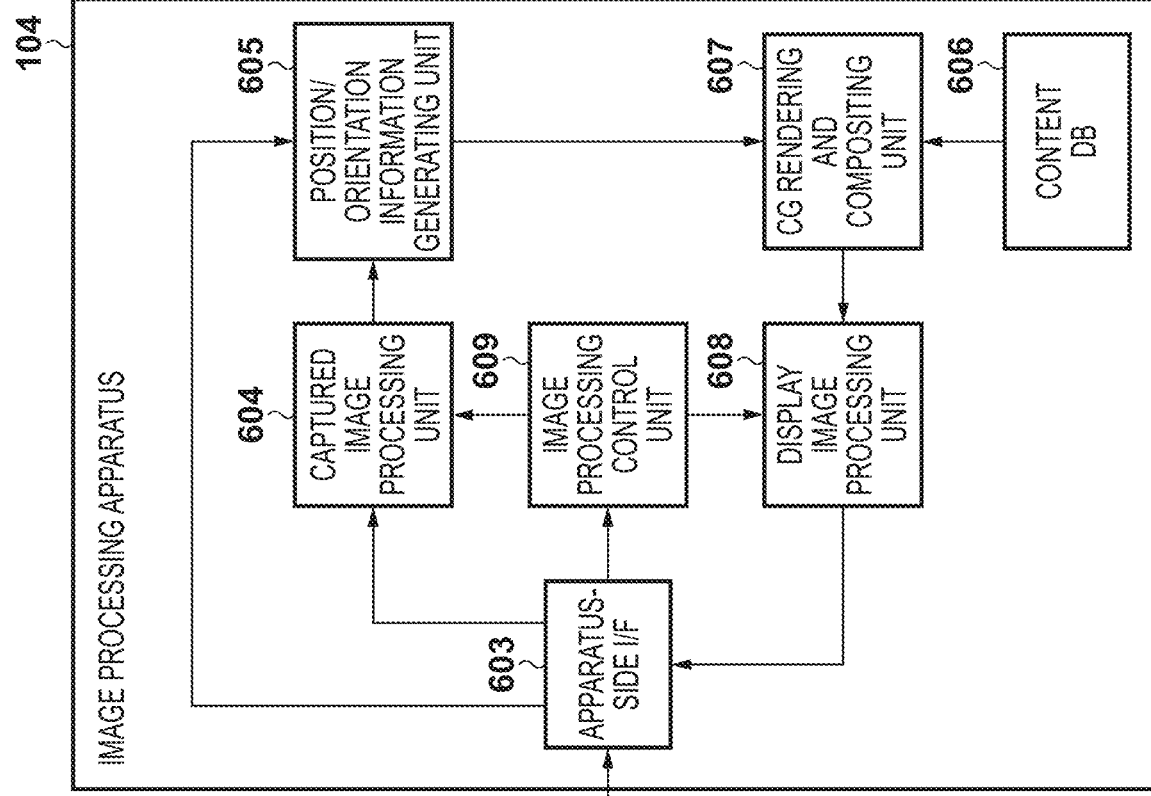
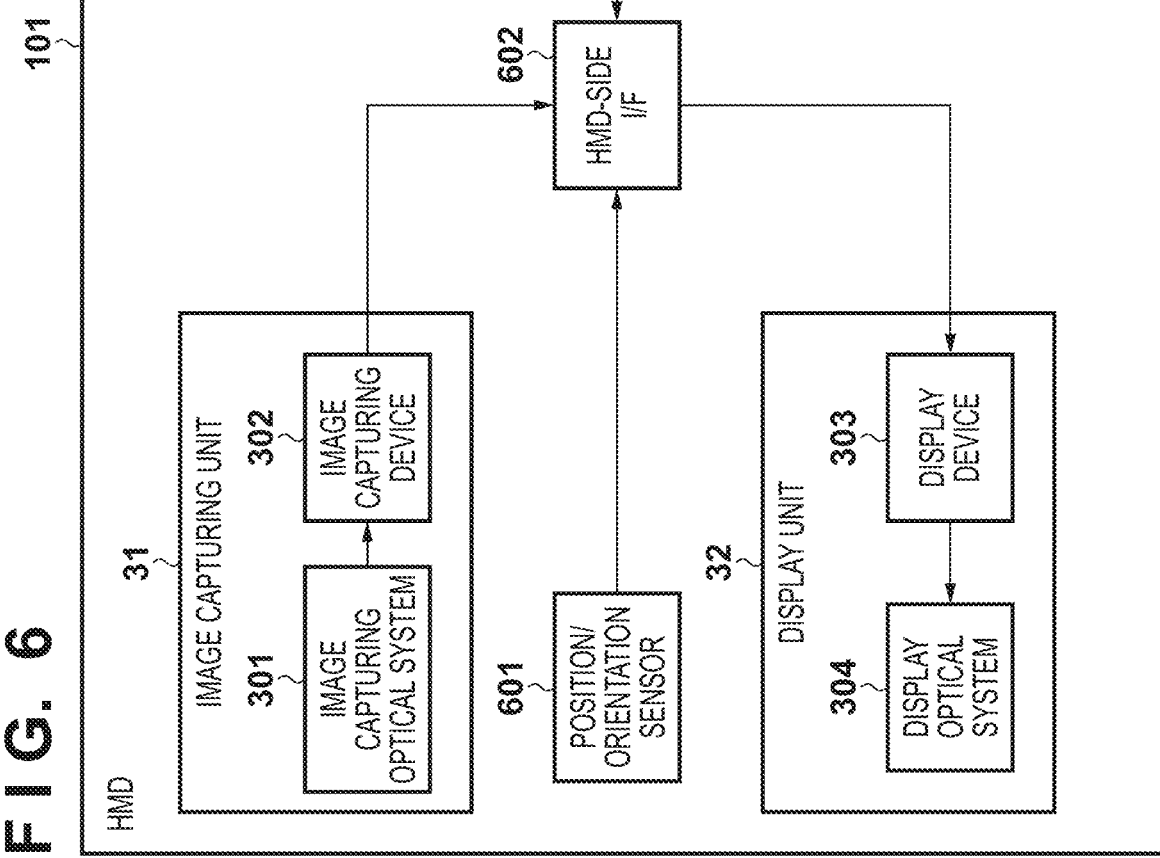

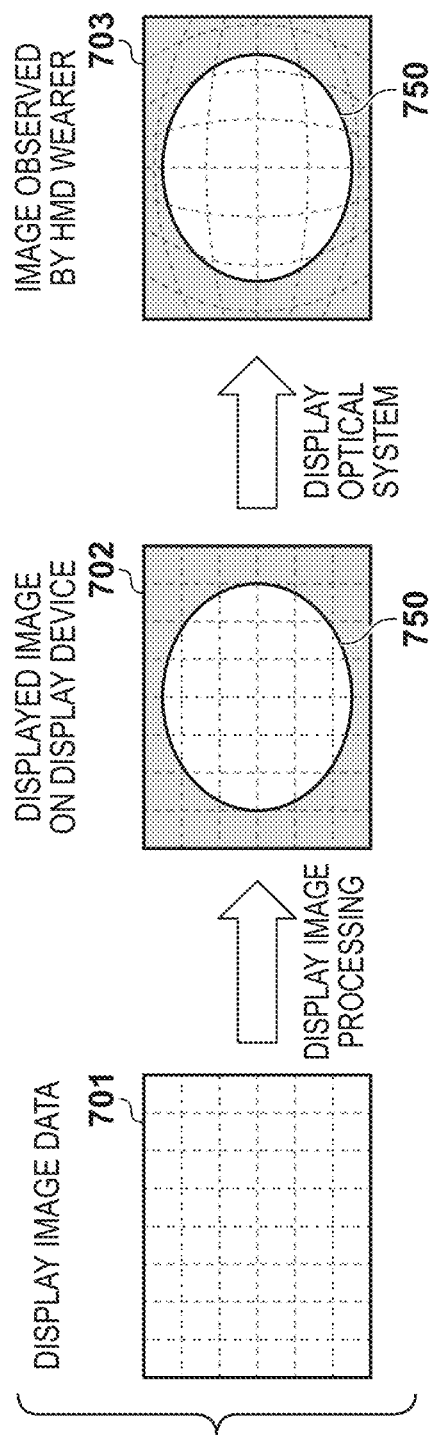
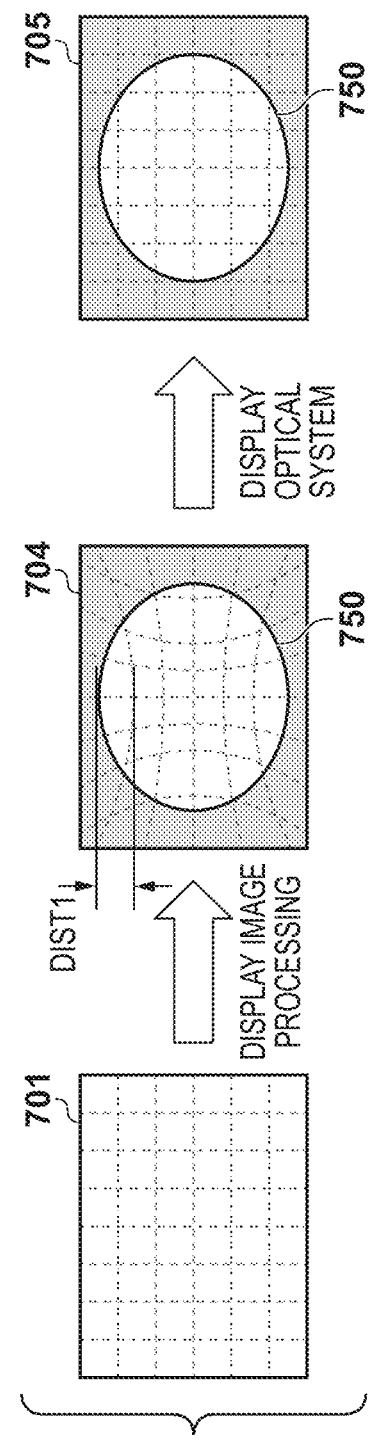
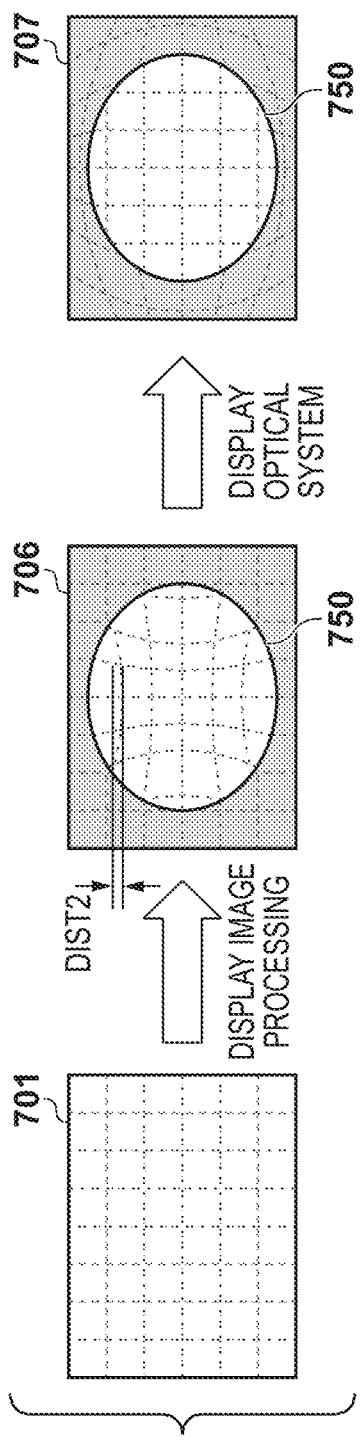
FIG. 7A
FIG. 7B
FIG. 7C

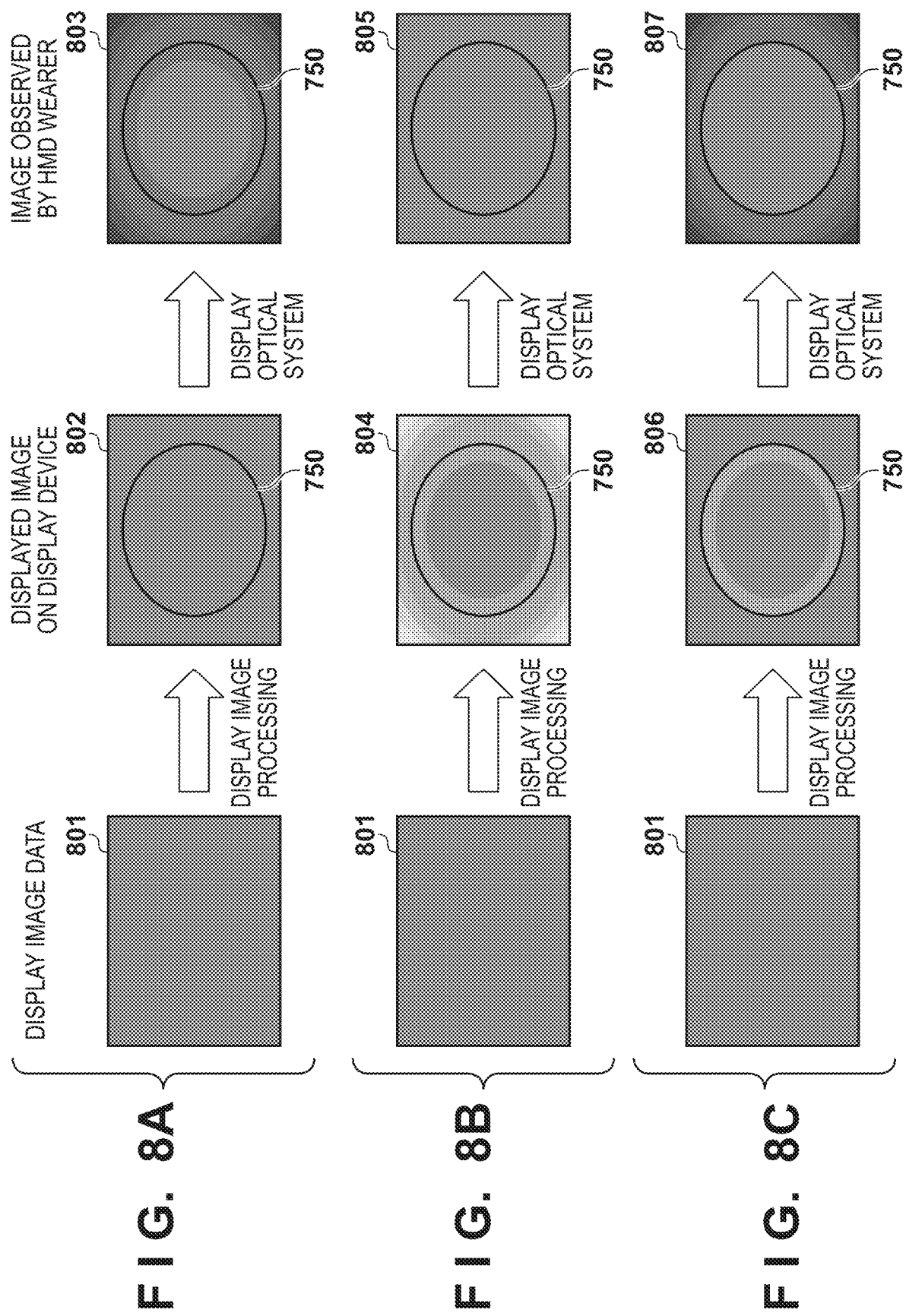

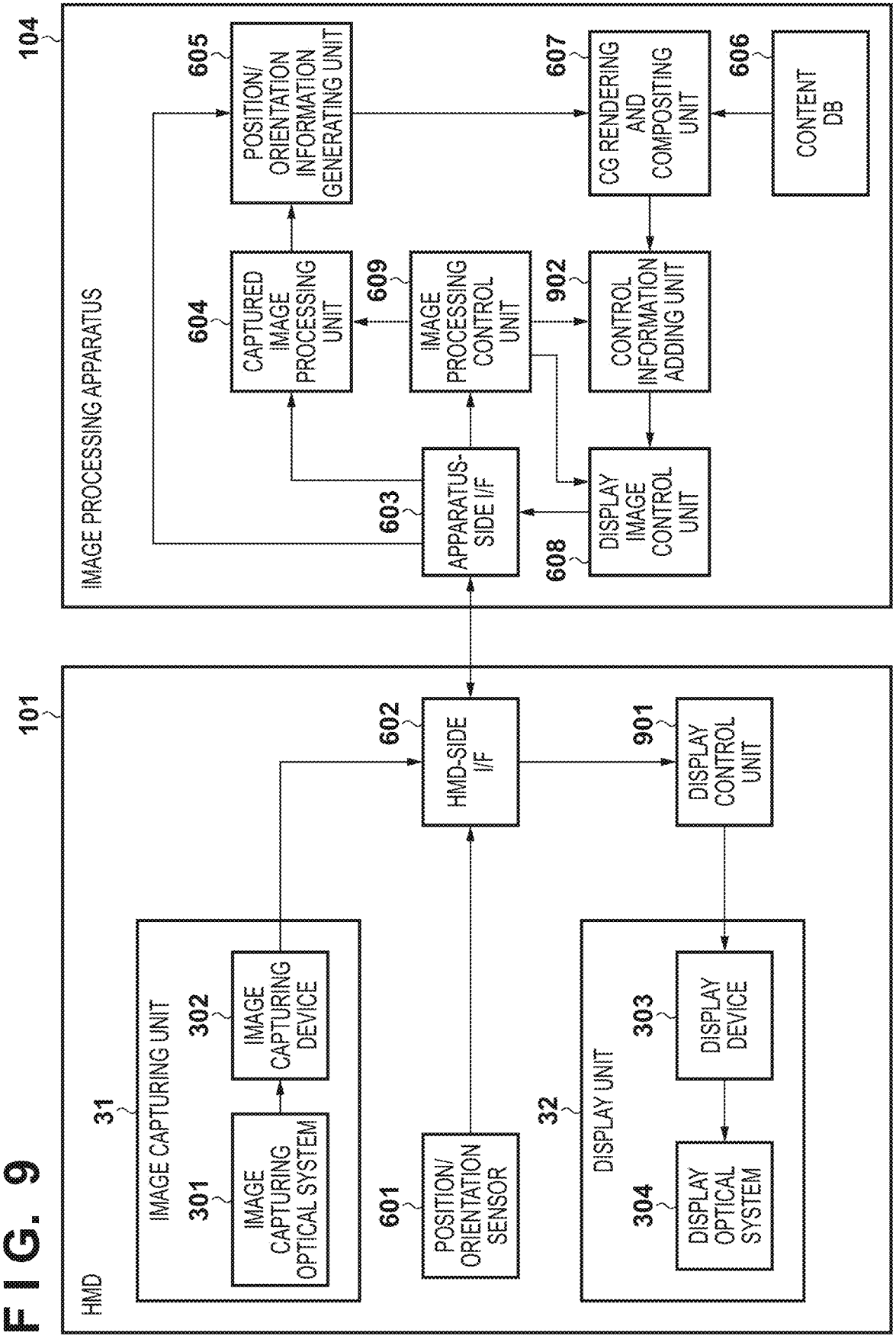

IMAGE PROCESSING APPARATUS, METHOD FOR CONTROLLING THE SAME, NON-TRANSITORY COMPUTER-READABLE STORAGE MEDIUM, AND SYSTEM

BACKGROUND OF THE INVENTION

Field of the Invention

The present invention relates to a technology for generating an image to display on a head mounted display.

Description of the Related Art

In recent years, technologies for achieving a mixed reality, so-called MR (mixed reality) technologies, are becoming known as technologies for merging physical and virtual worlds seamlessly, in real time. One of the known MR technologies is a technology in which a video see-through HMD (head mounted display: hereinafter referred to as "HMD" as necessary) is used to capture a subject that roughly matches a subject observed from a position of pupils of an HMD user with a video camera and such, CG (computer graphics) is superimposed and displayed on that captured image, and then that image is displayed on an HMD display unit to enable the HMD user to observe.

In an MR system, there is a need for high performance in arithmetic processing for obtaining HMD position and orientation information from a captured image, graphics features for real-time CG rendering, and such. Therefore, a configuration in which the HMD is connected to a dedicated image processing apparatus, a workstation, or the like is generally used. To achieve real-time performance and large-volume data transmission that is required of an MR system, a wired connection that uses multi-conductor cables such as metal cables and optical fibers has often been employed for data transmission between an HMD and an image processing apparatus. To reduce movement restrictions placed on the HMD user by cables and to enable a more free experience of an MR space, wireless communication or thinner cables for connecting an HMD and an image processing apparatus have been desired; however, to realize these requires power saving by reducing image processing loads, transmission data amounts, and such.

For example, an image processing apparatus that is able to control an A/D conversion circuit using a gate clock signal outputted from a clock control circuit and to crop a video signal that is within a subject's field of view, from a rectangular image capturing region of an image capturing unit to reduce power consumption is disclosed in the reference Japanese Patent Laid-Open No. 2005-109877.

In addition to the example above, it has become possible to achieve thinner cables using data volume reduction methods such as a resolution conversion, image encoding, and a frame rate conversion, and furthermore, with an improvement of wireless transmission technologies in recent years, it is becoming possible to achieve wireless data transmission.

In the method disclosed in the aforementioned reference, because it crops inside the field of view so that the image format itself no longer is of a typical rectangular shape, it is not able to accommodate to an image format that is compatible with an image processor or a display panel or a transmission format of a transfer protocol in a transmission channel in later stages. Therefore, with the image format as is, a general-purpose image processor or a display panel could not be used, and a use of dedicated hardware that is compatible with a special image format or conversion processing to a general image format needs to be added.

SUMMARY OF THE INVENTION

According to an aspect of the invention, there is provided an image processing apparatus configured to communicate with a head mounted display, which comprises a display device and an optical system for imaging an image displayed on the display device in relation to a user's eyes, and to generate image data for displaying on the display device of the head mounted display, the image processing apparatus comprising: a generating unit configured to generate image data for displaying on the display device; and an image processing unit configured to, with regard to the image data generated by the generating unit, in relation to inside a visible area of the optical system, perform image processing for correcting a deterioration of image quality by the optical system.

By virtue of the present invention, an image to be displayed on a head mounted display can be generated at a lower load than ever before.

Further features of the present invention will become apparent from the following description of exemplary embodiments with reference to the attached drawings.

BRIEF DESCRIPTION OF THE DRAWINGS

FIG. 6 is a block configuration diagram of the image processing system according to the first embodiment.

FIGS. 7A to 7C are views for describing distortion correction processing according to the first embodiment.

FIGS. 8A to 8C are views for describing shading correction processing according to the first embodiment.

FIG. 9 is a block configuration diagram of the image processing system according to a second embodiment.

DESCRIPTION OF THE EMBODIMENTS

Figure 1:
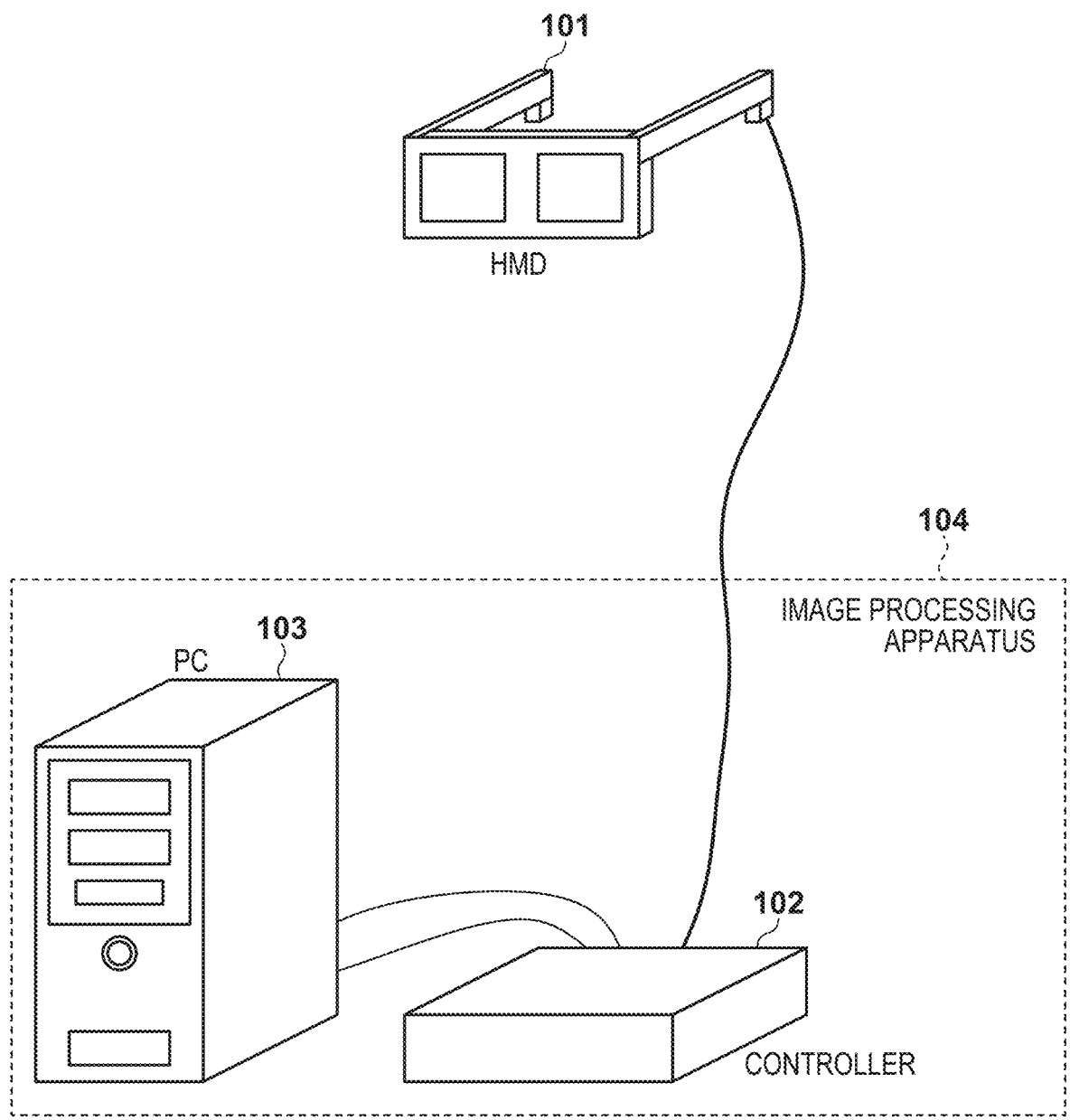
FIG. 1 is a view illustrating a configuration of an MR system apparatus that uses a display apparatus with an image capturing function.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view illustrating a configuration of an MR system according to a first embodiment.

The MR system comprises an HMD 101 comprising an image capturing function, a controller 102, and a PC 103. The HMD 101 comprises an image capturing unit for acquiring an image that represents a physical space in a wearer's field of vision and a display unit for providing the wearer with a display image such as a captured image acquired from the image capturing unit, an input image from the PC 103, or a composite image which is generated by the PC 103 in which the captured image is superimposed with a CG image. In FIG. 1, between the HMD 101 and the controller 102 is a wired connection, however, this may be a wireless connection. The HMD 101 may be configured to be driven by receiving a power supply from the controller 102 or to be driven by a battery. Any one of the HMD 101, the controller 102, and the PC 103 comprises a position and orientation information generating unit for generating (or detecting) three-dimensional position and orientation information of the HMD 101. The three-dimensional position and orientation information is generated using image information acquired by the image capturing unit of the HMD, an objective camera set up separately, or various types of sensor information such as that of an acceleration sensor, a gyro sensor, and a magnetic sensor. The PC 103 connected to the controller 102 comprises a CG rendering and compositing unit that performs rendering and compositing of a CG image observed from a viewpoint of an HMD user based on the three-dimensional position and orientation information. The controller 102 comprises all sorts of image processing functions such as an image resolution conversion, a color space conversion, an optical system distortion correction, and image encoding as well as a transmission function. In FIG. 1, the controller 102 and the PC 103 are in a separate hardware configuration, however, it is possible to aggregate features that are respectively comprised by the controller 102 and the PC 103 in configuring them as a dedicated image processing apparatus 104. In the descriptions hereinafter, from a functional perspective, a combination of features that the controller 102 and the PC 103 respectively comprise will be referred to as the image processing apparatus 104.

Figure 2:
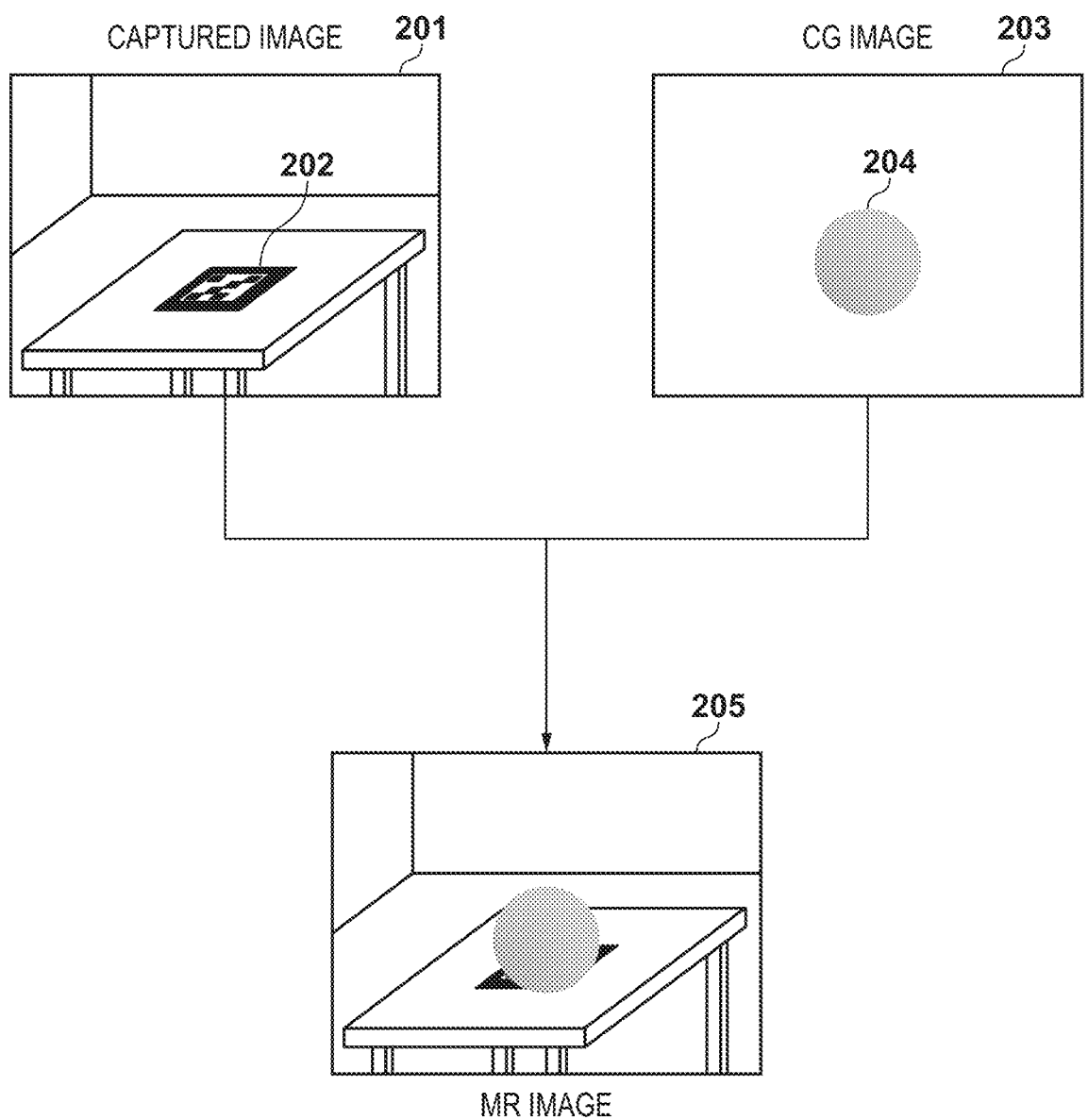
FIG. 2 is a view describing image compositing according to the MR system.

Next, image compositing in the MR system will be described with reference to FIG. 2.

A captured image 201 in the figure is an image of a physical space captured by the image capturing unit of the HMD 101. According to the HMD 101 for the MR system, it is preferable to arrange a central optical axis of an image capturing range of the image capturing unit to roughly match a direction of the HMD user's line of sight. A marker 202 in the captured image is an index used to calculate a position and orientation of the HMD user based on the captured image 201. The marker 202 is prearranged at multiple points in the actual space that the HMD user will be experiencing, information that is indicated by each marker is unique, and their positions are known beforehand.

A CG image 203 is an image rendered by the CG rendering and compositing unit in the image processing apparatus 104 based on the position and orientation information of the HMD 101 and renders a CG object 204 of a virtual space. The CG rendering and compositing unit superimposes the CG image 203 on the captured image 201 to thereby generate an MR image 205, and supplies the MR image 205 to the display unit of the HMD 101 to be displayed. With this, the present system is able to provide an MR space to the HMD user. When compositing an image, by using depth information of a three-dimensional space or information related to a transparency of a CG object, it becomes possible to generate a composite image that considers the anteroposterior relationship between an object in a real space and a CG object or a semi-transparent composite image in which the CG object is transparent.

Figure 3:
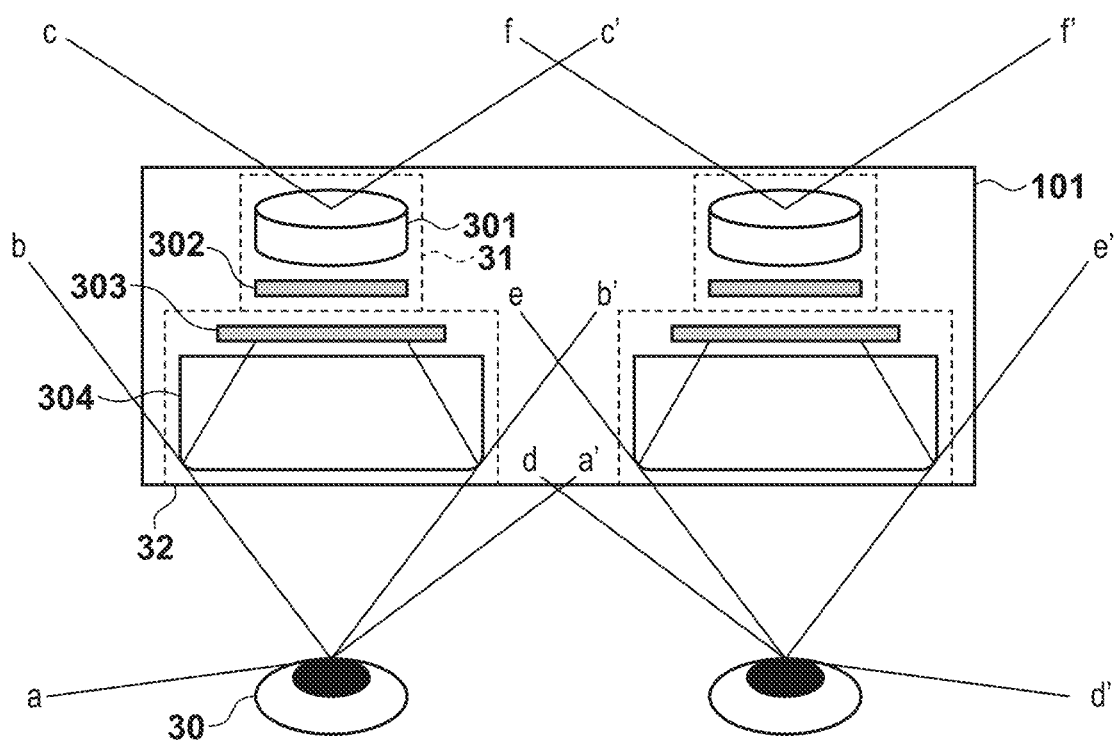
FIG. 3 is a view illustrating an HMD structure according to a first embodiment.

FIG. 3 is a configuration diagram of a main component of the HMD 101 in an image processing system according to the first embodiment. The HMD 101 according to the present embodiment is assumed to be that of a video see-through type. The HMD 101 comprises an image capturing unit 31 comprising an image capturing optical system 301 for capturing light in a physical space and an image capturing device 302 which converts light captured by the image capturing optical system 301 into an electrical signal. The HMD 101 also comprises a display unit 32 comprising a display device 303 for displaying an MR image and a display optical system 304 for imaging the same displayed video image in relation to eyes 30 of the HMD user.

The image capturing optical system 301 may, in some cases, comprise not only a fixed focal length optical system but also a zoom mechanism for adjustments described later, and also comprise, in some cases, a foldable optical system for decreasing dimensions of the overall HMD, or even use parts such as mirrors and prisms in front of a lens. The image capturing device 302 uses, for example, a CMOS image sensor, a CCD image sensor, and such.

The display device 303 uses, for example, a small liquid crystal display or organic electroluminescence display, or a retina scan type device by an MEMS, and such. The display optical system 304 may use not only a decentered optical system such as a free curvature prism but also a normal coaxial optical system or an optical system comprising a zoom mechanism for adjustments described later.

An angle a-a' and the angle d-d' indicate the respective viewing angles of a left eye and a right eye of the HMD user, and in humans, this viewing angle is known to be approximately 150 degrees. Also, the angle a-d' is a viewing angle of both eyes of the HMD user, and is approximately 200 degrees in a horizontal direction which is known to characterize the human viewing angle. Humans also have a viewing angle of approximately 150 degrees in a vertical direction, however, description here will be specific to the horizontal direction in consideration of an aspect of the present embodiment being that it supports two eyes. Thus, a description of the vertical direction will be omitted, however, to obtain an effect of the present embodiment, a technique described below is assumed also to be applied in a vertical direction.

The angle b-b' and an angle e-e' are angles between tangent lines that connect a left eye and a right eye of the HMD user to a periphery of the respective display optical system 304 and are dead angles in which the HMD user is unable to directly view a background within those angles. It is important to arrange the image capturing unit 31 and the display device 303 constituting the video see-through type HMD to be roughly within the dead angles to ensure a continuity with an actual field of vision without blocking a visual periphery of the HMD user.

An angle c-c' and an angle f-f indicate view angles of the image capturing units, and for the HMD user to continuously be able to view a video see-through image that can be seen from their perspective, in the angle b-b' and the angle e-e' and other actual fields of vision, the angle c-c' and the angle f-f are required to be wider than or equal to the angle b-b' and the angle e-e'.

Figure 4:
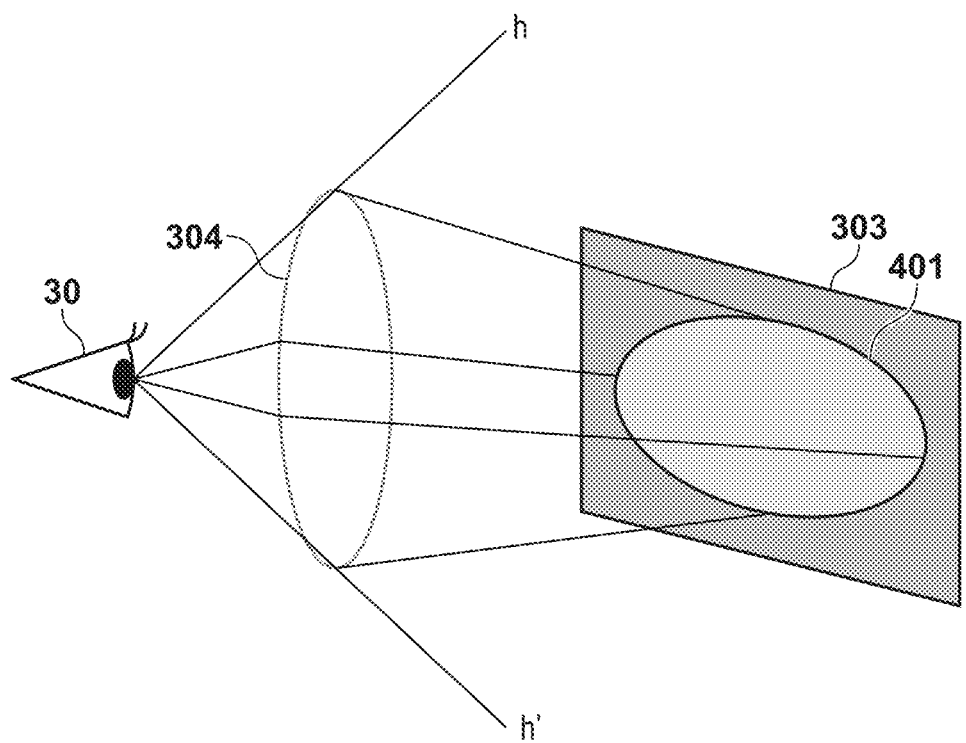
FIG. 4 is a view describing details of a display unit of an image processing system according to the first embodiment.

FIG. 4 is a view describing the details of the display unit of the image processing system according to the first embodiment. FIG. 4 represents a view of the HMD user's eye from a horizontal direction, and an angle h-h' indicates a display view angle in a vertical direction. The HMD user is able to observe a display image displayed on the display device 303 through the display optical system 304, however, at this point, an active visible area 401 of the display optical system is a smaller region than the entire display region of the display device 303. In a case where the active visible area 401 of the display optical system 304 is greater than the display region of the display device 303, the HMD user will see a display device surface, a display device frame, or a structure inside the HMD which would cause a sense of unnaturalness and at the same time, the continuity between the displayed video image and the actual field of vision in the visual periphery will be lost.

Furthermore, the fact that the angle c-c'(the angle f-f') is the same or greater than the angle b-b'(the angle e-e') in FIG. 3 can be utilized in adjusting the active visible area 401 of the display optical system to be the same as an angle of the video see-through image, which is a captured image displayed on a display device, to make a continuous viewing of the displayed video image and the actual field of vision in the visual periphery possible.

Next, a description of how an appearance of the image processing system is experienced by the HMD user according to the first embodiment will be given with reference to FIG. 5A to 5F.

Figure 5A:
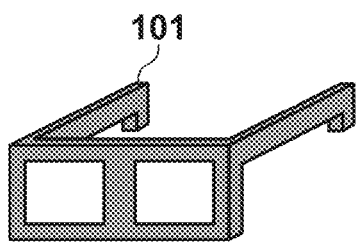
FIGS. 5A to 5F are views describing how the image processing system appears to an HMD user according to the first embodiment.
Figure 5D:
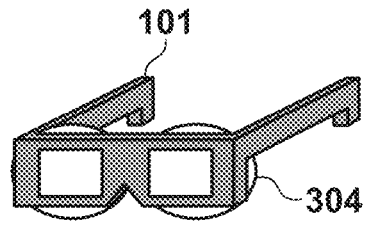
Figure 5B:
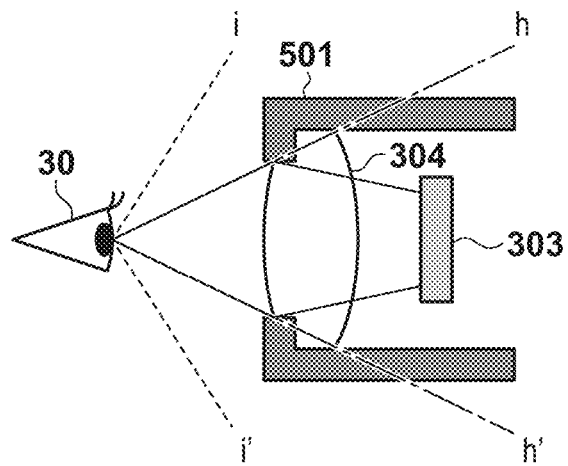
Figure 5E:
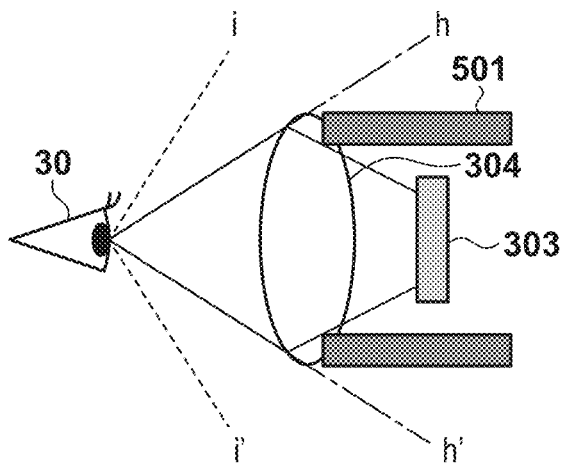
Figure 5C:
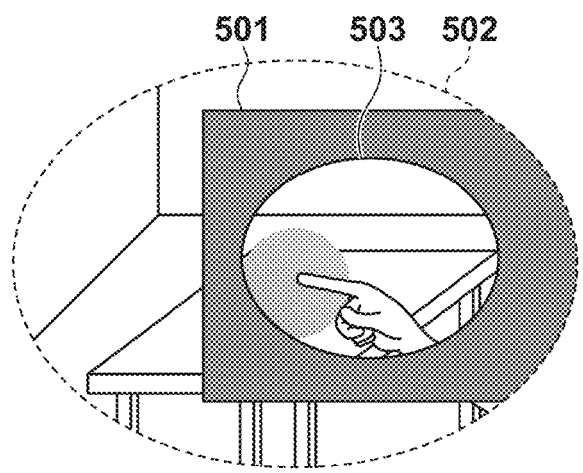

FIGS. 5A, 5B, and 5C illustrate how things may appear to the HMD user in an HMD configured to have an exterior frame 501 in a position that is visible from the HMD user.

In FIGS. 5A and 5B, a configuration in which the exterior frame 501 is present between the angle h-h' of the active visible area of the display optical system of the HMD 101 and a viewing angle i-i' in a vertical direction is illustrated. Thus, as illustrated in FIG. 5C, the HMD user can continuously see a boundary 503 between the displayed video image and the actual field of vision in the visual periphery over the exterior frame 501.

Figure 5F:
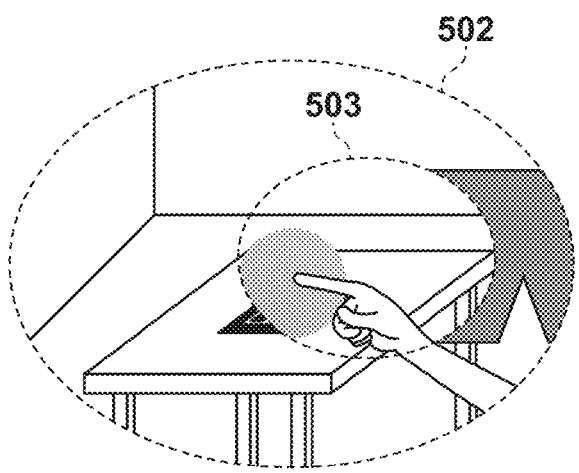

FIGS. 5D, 5E, and 5F illustrate how things may appear to the HMD user in an HMD configured to have the exterior frame 501 in a position that is not visible from the HMD user.

In FIGS. 5D and 5E, a configuration in which the exterior frame 501 is not present between the angle h-h' of the active visible area of the display optical system of the HMD 101 and the viewing angle i-i' in a vertical direction is illustrated. Thus, as illustrated in FIG. 5F, the HMD user can see the boundary 503 between the displayed video image and the actual field of vision in the visual periphery within the entire visual field 502 as completely continuous, except for a part of the region.

In the present embodiment, in either configuration, the boundary between the displayed video image and the actual field of vision in the visual periphery are treated as being viewed as continuous.

FIG. 6 is a block diagram of the image processing system according to the first embodiment. The present system comprises the HMD 101 and the image processing apparatus 104. The HMD 101 comprises the image capturing unit 31 comprising the image capturing optical system 301 and an image capturing device 302. The HMD 101 also comprises a position and orientation sensor 601 and an HMD-side I/F (interface) 602. Furthermore, the HMD 101 comprises the display unit 32 comprising the display optical system 304 and the display device 303. Note that the position and orientation sensor 601 may be omitted if the image processing apparatus 104 is to determine a position and orientation of the HMD 101 based on an image acquired by the image capturing unit 31.

The image processing apparatus 104 comprises an apparatus-side I/F 603, a captured image processing unit 604, a position and orientation information generating unit 605, a content DB (database) 606, a CG rendering and compositing unit 607, a display image processing unit 608, and an image processing control unit 609.

An HMD-side I/F 602 and the apparatus-side I/F 603 each comprise a transmission unit and a reception unit, and a bidirectional communication is possible between these interfaces. The HMD 101 also comprises two image capturing units 31 and two display units 32 to correspond to the left eye and the right eye of the wearer; however, illustration is omitted.

The image capturing unit 31 of the HMD 101 acquires a captured image serving as a stereo image comprising a parallax roughly matching that of sight-line positions respective to the left eye and the right eye of the HMD user. The image capturing unit 31 comprises the image capturing optical system 301 and the image capturing device 302.

The position and orientation sensor 601 acquires information for calculating the three-dimensional position and orientation information related to a position and direction of the HMD user's perspective. For example, an objective camera, a magnetic sensor, an acceleration sensor, an angular velocity sensor, and such are used as the position and orientation sensor 601. The position and orientation sensor 601 is not necessarily required to be comprised in the HMD 101 and may be configured, for example, to acquire required information from an image captured by an objective camera positioned near the HMD user.

The HMD-side I/F 602 performs communication between the image processing apparatus 104 and the apparatus-side I/F 603. The HMD-side I/F unit 602 transmits the captured image acquired by the image capturing unit 31 and sensor information acquired by the position and orientation sensor 601 to the image processing apparatus 104. The HMD-side I/F unit 602 also performs reception of the display image from the image processing apparatus 104 to be displayed by the display unit 32. In addition, the HMD-side I/F unit 602 performs transmission and reception of all sorts of control signals.

The display unit 32 performs a display of the MR image superimposed with CG for the HMD user to observe. The display unit 32 comprises two sets of the display optical system 304 and the display device 303 to match the left and right eyes of the HMD user. However, a configuration may be taken so that a display region of a single display device is divided into left and right regions, and these regions displays an image to be observed respectively by a left and a right eye.

The apparatus-side I/F 603 of the image processing apparatus 104 performs communication to and from the HMD-side I/F 602 of the HMD 101. Specifically, the apparatus-side I/F 603 performs the reception of the captured image acquired by the image capturing unit 31 and the sensor information acquired by the position and orientation sensor 601. The apparatus-side I/F 603 also performs transmission of the display image generated by the image processing apparatus 104 to be displayed by the display unit 32. In addition, the apparatus-side I/F 603 performs transmission and reception of all sorts of control signals.

The captured image processing unit 604 performs image processing of the captured image for the left eye and the right eye via multiple image processing circuits. The position and orientation information generating unit 605 calculates the three-dimensional position and orientation information of the HMD 101 based on the sensor information acquired by the position and orientation sensor 601, the information from the captured image, or both. The content DB 606 is a database that stores content for CG rendering. The CG rendering and compositing unit 607, based on the three-dimensional position and orientation information of the HMD 101, executes CG object (virtual object) rendering as well as captured image and CG object compositing and generates the display image for the MR experience.

The display image processing unit 608 performs image processing for the display images generated in the CG rendering and compositing unit for the left eye and for the right eye via multiple image processing circuits.

The image processing control unit 609, based on the active visible area of the display optical system with respect to the display device 303, performs control of the captured image processing unit 604 and the display image processing unit 608.

With the above configurations, the HMD 101 wearer will be able to experience a highly realistic MR image in which a captured image space seen from their perspective has been composited with a CG image.

Note that configuration elements of the image processing system not mentioned above are also present; however, description is omitted because they are not a main focus of the present embodiment.

Next, distortion correction processing in the first embodiment will be described with reference to FIGS. 7A to 7C.

FIG. 7A illustrates a case where a distortion correction of the display optical system is not performed in an image procedure from when display image data is rendered to when the HMD user observes the display image.

Display image data 701 is the display image data generated in the CG rendering and compositing unit 607 and should be understood as image data rendered without considering a distortion of the display optical system. The image that is displayed on the display device 303 without display optical system distortion correction processing being performed in the display image processing unit 608 in relation to the display image data 701 is a display image 702. When the display image 702 passes the display optical system 304, it becomes an observation image 703 due to the distortion of the display optical system 304. The HMD user is able to observe an image inside an active visible area 750 of the display optical system inside the observation image 703 as the MR image, and in this case, an image that is distorted by the optical system will end up being observed.

FIG. 7B illustrates a case where the display optical system distortion correction is performed in relation to the entire region of the display image data in the procedure from when the display image data is rendered to when the HMD user observes the display image.

The display image data 701 in FIG. 7B is the image data that was rendered without considering the distortion of the display optical system similarly to FIG. 7A. The image that is displayed on the display device 303 after the display optical system 304 distortion correction processing is performed in the display image processing unit 608 in relation to the entire region of the display image data 701 is a display image 704. A display image 704 is generated by performing processing to distort the display image data in an opposite direction from the distortion in the display optical system 304. When the display image 704 passes the display optical system 304, it becomes an observation image 705 whose display optical system distortion has been canceled. The HMD user is able to observe an image inside the active visible area 750 of the display optical system 304 inside the observation image 705 as the MR image, and in this case, an image whose display optical system distortion has been corrected and looks natural will end up being observed.

FIG. 7C illustrates a case where the display optical system distortion correction is performed in relation to inside the active visible area 750 of the display optical system in the procedure from when the display image data is rendered to when the HMD user observes the display image.

The display image data 701 in FIG. 7C is the image data that was rendered without considering the distortion of the display optical system similarly to FIGS. 7A and 7B. The image that is displayed on the display device 303 after having performed display optical system distortion correction processing in the display image processing unit 608 in relation to the active visible area 750 of the display optical system in the display image data 701 is a display image 706. When the display image 706 passes the display optical system, it becomes an observation image 707 whose display optical system distortion has been canceled. The HMD user is able to observe an image inside the active visible area 750 of the display optical system inside the observation image 707 as the MR image, and in this case, similarly to FIG. 7B, an image whose display optical system distortion has been corrected and looks natural will end up being observed.

Generally, the wider a target region for the distortion correction is, the larger the size of a correction table used for the correction processing gets, and a processing load also increases. Also, the larger the distortion amount in the target region for correction is, the larger a line memory used for the distortion correction processing gets, and a required image memory amount tends to increase. Here, when FIGS. 7B and 7C are compared, it can be confirmed that the target region for the distortion correction is narrower in the processing in FIG. 7C than in the processing in FIG. 7B. Furthermore, from the fact that a distortion amount DIST 1 in the target region for correction in the display image 704 is smaller than a distortion amount DIST 2 in the display image 706, it can be seen that the processing in FIG. 7C requires less memory amount for the distortion correction processing.

In the image processing system according to the first embodiment, by not performing image processing for images outside the active visible area 750 of the display optical system 304, the memory amount required for the image processing is reduced. Also, because the image processing outside the active visible area 750 of the display optical system 304 is not performed, an arithmetic processing load of the image processing is reduced, and so it becomes possible to achieve a reduction of power consumption.

Next, shading correction processing according to the first embodiment will be described with reference to FIG. 8A to 8C. FIG. 8A illustrates a case where the shading correction in relation to a decrease in peripheral brightness of the display optical system 304 is not performed in the procedure from when the display image data is rendered to when the HMD user observes the display image.

The display image data 801 indicates the display image data generated in the CG rendering and compositing unit 607 and is image data rendered without considering the decrease in peripheral brightness of the display optical system 304. The image that is displayed on the display device 303 without the shading correction processing being performed in the display image processing unit 608 in relation to the display image data 801 is a display image 802. When the display image 802 passes the display optical system 304, it becomes an observation image 803 due to the decrease in peripheral brightness of the display optical system 304. The HMD user is able to observe an image inside the active visible area 750 of the display optical system 304 inside the observation image 803 as the MR image, and in this case, an image whose peripheral brightness has dropped will end up being observed.

FIG. 8B illustrates a case where the shading correction is performed in relation to the entire region of the display image data in the procedure from when the display image data is rendered to when the HMD user observes the display image.

The display image data 801 in FIG. 8B is the image data that was rendered without considering the decrease in peripheral brightness of the display optical system 304 similarly to FIG. 8A. The image that is displayed on the display device 303 after the shading correction processing is performed in the display image processing unit 608 in relation to the entire region of the display image data 801 is a display image 804. The display image 804 is generated by performing processing to raise a pixel value of the display image data in order to compensate for the decrease in brightness of the display optical system 304. When the display image 804 passes the display optical system 304, it becomes an observation image 805 whose decrease in peripheral brightness of the display optical system 304 has been canceled. The HMD user is able to observe an image inside the active visible area 750 of the display optical system 304 inside the observation image 805 as the MR image, and in this case, an image whose decrease in peripheral brightness of the display optical system 304 has been corrected and looks natural will end up being observed.

FIG. 8C illustrates a case where the shading correction is performed only to what is inside the active visible area of the display optical system 304 in the procedure from when the display image data is rendered to when the HMD user observes the display image.

The display image data 801 in FIG. 8C is the image data that was rendered without considering the decrease in peripheral brightness of the display optical system 304 similarly to FIGS. 8A and 8B. The image that is displayed on the display device 303 after having performed the shading correction processing in the display image processing unit 608 in relation to the active visible area 750 of the display optical system 304 in the display image data 801 is a display image 806. When the display image 806 passes the display optical system 304, it becomes an observation image 807 whose decrease in peripheral brightness of the display optical system 304 has been canceled. The HMD user is able to observe an image inside the active visible area 750 of the display optical system 304 inside the observation image 807 as the MR image, and in this case, similarly to FIG. 8B, an image whose decrease in peripheral brightness of the display optical system 304 has been corrected and looks natural will end up being observed.

Regarding the shading correction, similarly to the distortion correction processing, the wider the target region for correction is, the larger the size of the correction table that is used gets, and so the required image memory amount increases. Therefore, in the image processing system according to the first embodiment, by not performing the shading correction processing for images outside the active visible area 750 of the display optical system 304, the memory amount required for the image processing is reduced.

Also, as is clear from comparing the display image 804 and the display image 806, because the display image 806 is able to keep display gradients outside the active visible area of the display optical system 304 lower, the power consumption can be reduced than when displaying the display image 804. By utilizing this, it becomes possible, in the shading correction processing, to perform processing, for example, displaying black and such, which is different from the processing inside the active visible area, on the display gradients outside the active visible area of the display optical system 304 so that the power consumption is lower.

As described above, according to the image processing system in the first embodiment, by not performing the image processing outside the active visible area of the display optical system that the HMD comprises or by performing processing that is different from the processing inside the active visible area, the memory amount required for the image processing or the image processing load can be reduced, thereby achieving cost reduction and power saving. Also, because in the course of the image processing, a format is not changed to a special image format, it is not necessary to use dedicated hardware that is compatible with the special image format or to an add processing for conversion into a general image format. Therefore, a general-purpose display panel or image processor can be employed, and it becomes possible to, without leading to an increase in cost of the entire image processing system, reduce cost by reducing the memory amount and reducing the image processing load, and attain a power saving effect.

Note that although in the above embodiment, the position and size of the active visible area 750 is described to be fixed, a configuration may be taken so that this position and size can be fine-tuned within a preset range. This is so that the correction is performed according to a displacement of a mounting position on where the person wears the HMD 101 and the size of the person's head (eye position). An instruction for fine-tuning in such cases may be performed from a user interface of the PC 103 comprised by the image processing apparatus 104. The display image processing unit 608 will perform processing in accordance with the active visible area 750 whose position and size have been fine-tuned. The same goes for the second embodiment described below.

Second Embodiment

In the above first embodiment, a configuration in which the image processing outside the active visible area of the display optical system 304 is not performed or processing that is different from the processing inside the active visible area is performed was described. In a second embodiment that is described below, a configuration in which added control information is embedded in the display image data positioned outside the active visible area of the display optical system 304 will be described.

A block configuration diagram of the image processing system in the second embodiment is illustrated in FIG. 9. The present system comprises the HMD 101 and the image processing apparatus 104. The HMD 101 comprises the image capturing unit 31 comprising the image capturing optical system 301 and the image capturing device 302. The HMD 101 comprises the position and orientation sensor 601, the HMD-side I/F (interface) 602, and a display control unit 901. Furthermore, the HMD 101 comprises the display unit 32 comprising the display optical system 304 and the display device 303.

The image processing apparatus 104 comprises the apparatus-side I/F 603, the captured image processing unit 604, the position and orientation information generating unit 605, the content DB (database) 606, the CG rendering and compositing unit 607, the display image processing unit 608, the image processing control unit 609, and a control information adding unit 902.

The HMD-side I/F 602 and the apparatus-side I/F 603 each comprise a transmission unit and a reception unit, and is able to perform a bidirectional communication. The HMD 101 also comprises two image capturing units 31 and two display units 32 to correspond to the left eye and the right eye of the wearer; however, illustration is omitted.

The image capturing unit 31 of the HMD 101 acquires a captured image serving as a stereo image comprising a parallax roughly matching that of sight-line positions respective to the left eye and the right eye of the HMD user. The image capturing unit 31 comprises the image capturing optical system 301 and the image capturing device 302.

The position and orientation sensor 601 acquires information for calculating the three-dimensional position and orientation information related to a position and direction of the HMD user's perspective.

The HMD-side I/F 602, by communicating with the apparatus-side I/F 603 of the image processing apparatus 104, performs the transmission of the captured image acquired by the image capturing unit 31 and the sensor information acquired by the position and orientation sensor 601, and the reception of the display image displayed by the display unit 32, as well as the transmission and reception of other control signals.

A display control unit 901 performs control of the display unit 32 based on the control information added to the display image data received from the image processing apparatus 104. Here, information such as a setting parameter for when performing the image processing in the display image processing unit 608 in a later stage and a time stamp for achieving synchronicity between the display images for the left eye and the right eye are examples of the control information that is added to the display image data.

The display unit 32 performs a display of the MR image superimposed with CG for the HMD user to observe. The display unit 32 comprises the display optical system 304 and the display device 303.

The apparatus-side I/F 603 of the image processing apparatus 104, by communicating with the HMD-side I/F 602 of the HMD 101, performs the reception of the captured image acquired by the image capturing unit 31 and the sensor information acquired by the position and orientation sensor 601, and the transmission of the display image displayed by the display unit 32, as well as the transmission and reception of other control signals.

The captured image processing unit 604 performs the image processing of the captured image for the left eye and the right eye via multiple image processing circuits.

The position and orientation information generating unit 605 calculates the three-dimensional position and orientation information of the HMD 101 based on the sensor information acquired by the position and orientation sensor 601, the information from the captured image, or both.

The content DB 606 is a database that stores content for CG rendering.

The CG rendering and compositing unit 607, based on the three-dimensional position and orientation information, refers to the content DB 606 in executing the CG image rendering, as well as the captured image and CG image compositing, and generates the display image for the MR experience.

The control information adding unit 902 performs processing for embedding control data in a part, which is outside the active visible area 750 of the display optical system inside the display unit 32 of the HMD 101, of the display image data for the left eye and the right eye composited in the CG rendering and compositing unit.

The display image processing unit 608, in relation to display images for the left eye and for the right eye, in which control information has been embedded by the control information adding unit, performs, via multiple image processing circuits, image processing based on the control information added to the display image data.

The image processing control unit 609, based on the active visible area 750 of the display optical system with respect to the display device 303, performs control of the captured image processing unit 604, the display image processing unit 608, and the control information adding unit 902. Note that processing what is inside the active visible area 750 is assumed to be the same as the previously-described first embodiment, and so the description thereof will be omitted.

With the above configurations, the HMD 101 wearer will be able to experience a highly realistic and natural MR image in which a captured image space seen from their perspective has been composited with a CG image.

Note that configuration elements of the image processing system not mentioned above are also present; however, description is omitted because they are not a main focus of the present embodiment.

Figure 10:
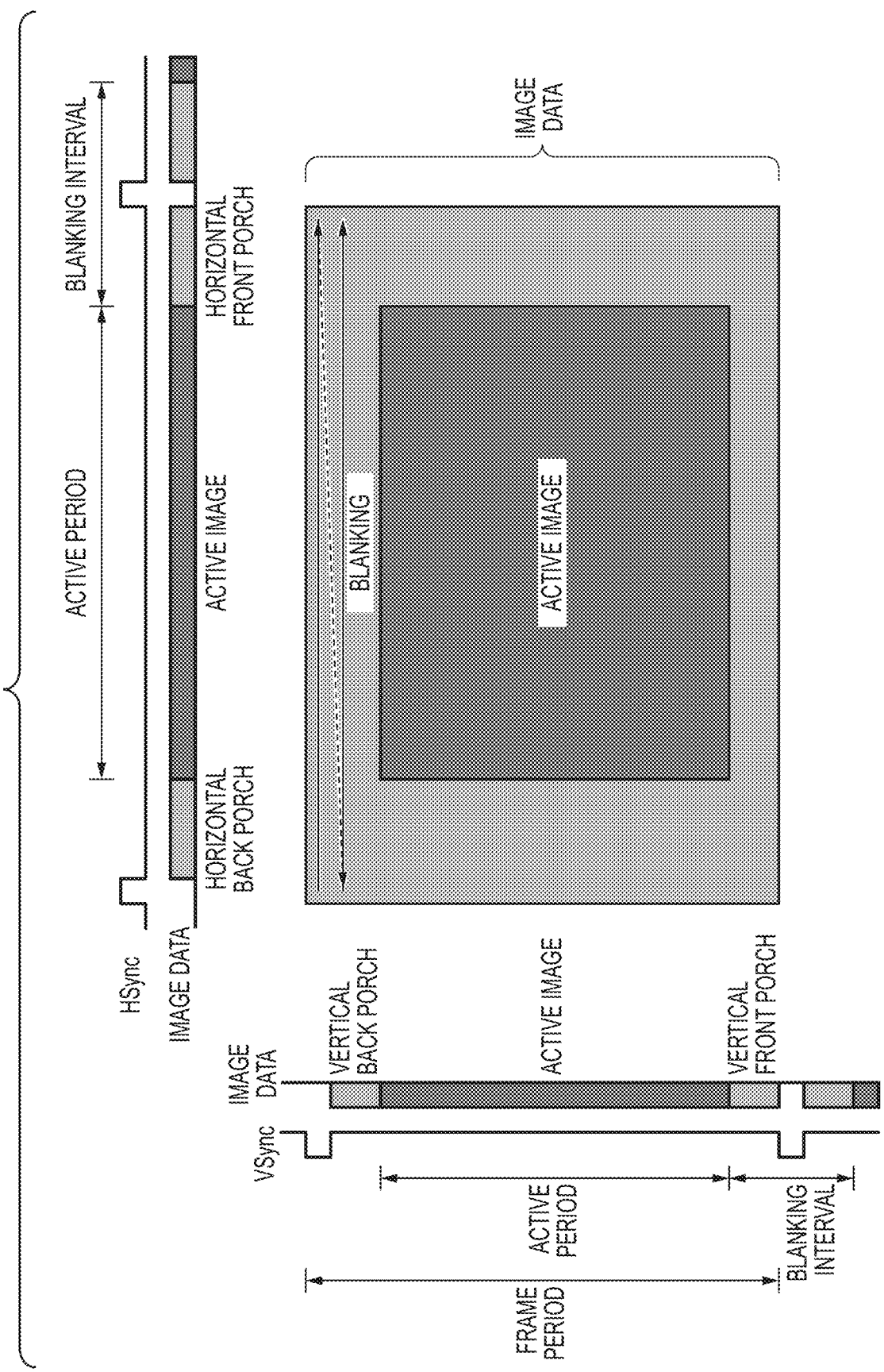
FIG. 10 is a view illustrating an example of a display image format of the image processing system according to the second embodiment.

FIG. 10 is a view illustrating an example of a display image format of the image processing system according to the second embodiment.

General-purpose display devices typically support image formats that are widespread and widely used such as a VESA standard. In FIG. 10, as an example of a display image format, an image format defined by a vertical synchronization signal VSync, a horizontal synchronization signal HSync, and the image data will be described.

The vertical synchronization signal VSync is used as a signal for defining a period of a single frame, and a period from a VSync to the next VSync is the period of a single frame. An active period is set, and a vertical front porch period before the active period and a vertical back porch period after the active period are set as a vertical blanking interval, and the image data in the vertical blanking interval is treated as inactive data, in other words, data that is not displayed by the display device.

The horizontal synchronization signal HSync is used as a signal for defining a period of a single line, and a period from an HSync signal to the next HSync is the period of a single line. An active period is set, and a horizontal front porch period before the active period and a horizontal back porch period after the active period are set as a horizontal blanking interval, and the image data in the horizontal blanking interval is treated as inactive data, in other words, data that is not displayed by the display device.

Regarding the image data, a scanning direction is to be in a horizontally rightward direction in units of pixel from a pixel positioned at a top-left, and pixel data is lined up sequentially. Continuing after a period of data for one line, a second line of pixel data vertically therebelow is arranged, and scanning thereof is repeated line by line and thereby a period of image data for one frame is configured. The one-frame period and the image data inside the active period excluding the blanking interval of the one-line period is an active image and is handled as data that is actually displayed by the display device.

Of the vertical and horizontal active periods, there may be cases where a border period (not illustrated) is defined at a boundary with the blanking interval. Often, the border period is defined as 0, and in the present embodiment, the border period will be described as 0.

In addition to the signals described above, a data enabling signal may separately be used for indicating the active period of the image data, however, it will be omitted in the description regarding the present embodiment.

Figure 11:
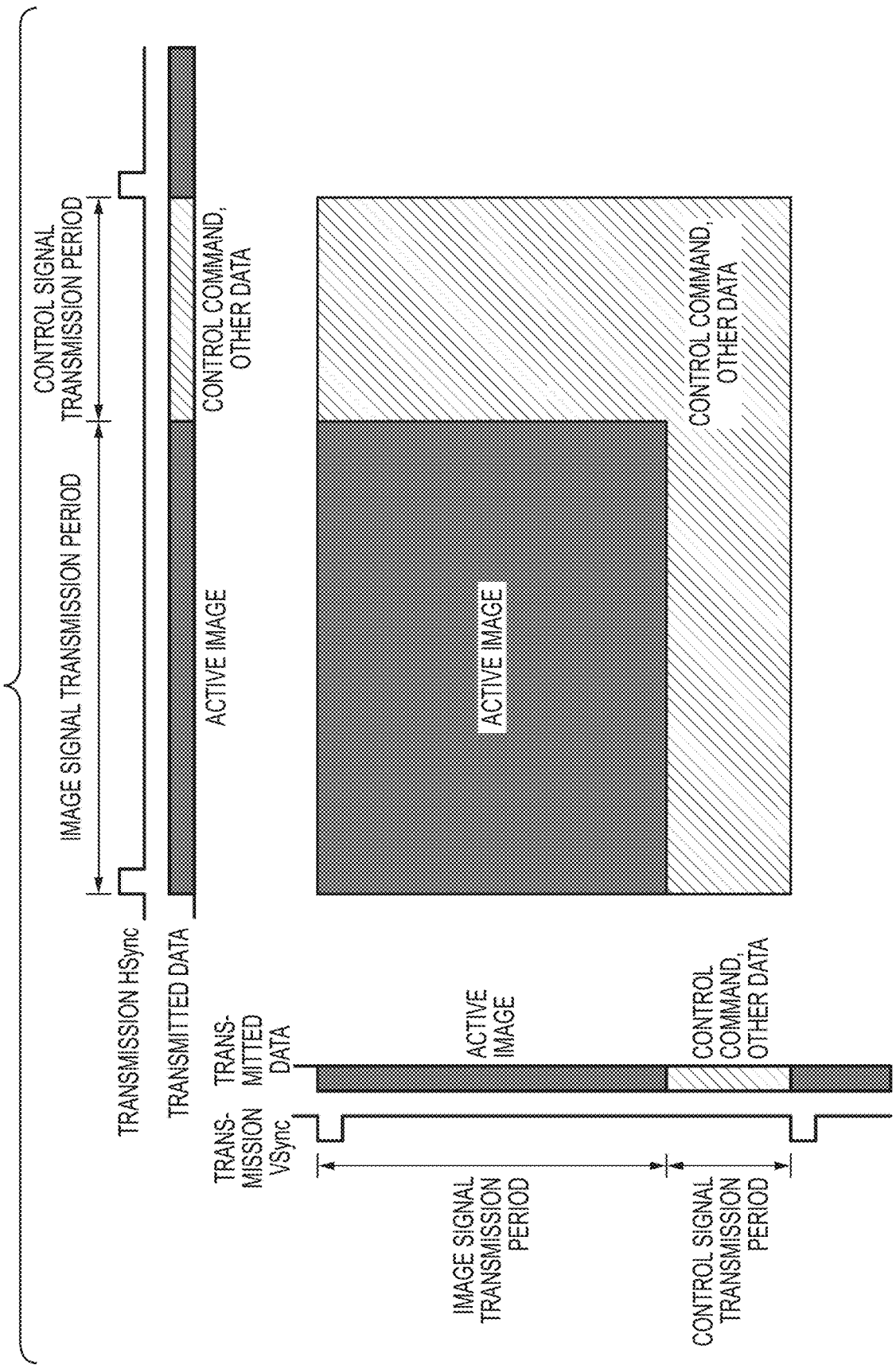
FIG. 11 is a view illustrating an example of a transmission format of the image processing system according to the second embodiment.

FIG. 11 is a view illustrating an example of a transmission format of the image processing system according to the second embodiment.

In the MR system, it is advantageous for a delay time from when the captured image of the physical space is acquired by the image capturing unit 31 of the HMD 101 to when the MR image is displayed by the display unit 32 to the HMD user after the performance of all sorts of processing to be short. A reduction of the delay time is effective in reducing motion sickness that may be caused by a discrepancy between the movement of the body, especially the head, and the movement of the displayed video image, and makes for a highly realistic MR experience possible. Therefore, each block in the image processing system is required to perform the processing in consideration of suppression of delay time, and the same applies to the transmission of the image data.

In the image processing system of the second embodiment, in the communication from the apparatus-side I/F 603 of the image processing apparatus 104 to the HMD-side I/F 602 of the HMD 101, a transmission of a control signal comprising a control command and other data in addition to the display image data is performed. In the apparatus-side I/F 603, image data compliant with the display image format is inputted sequentially in a scan order, however, as soon as active image data in the active period is inputted, it is transmitted to at the highest priority, and the blanking interval is used to transmit control signals, thereby enabling a reduction in a display image data transmission delay.

A transmission VSync in FIG. 11 is used as a signal for defining a period of a single frame, and a period from a transmission VSync to the next transmission VSync is the period of a single frame. Regarding a transmission VSync, by using information such as the VSync period, the vertical front porch period, the vertical active period, and the vertical back porch period which are defined by the image format, it is possible to calculate and generate a leading line of the active image in the image format with VSync as a trigger. A period that corresponds to a number of vertical lines in the active image from the transmission VSync is defined as a vertical image signal transmission period, and a period thereafter is defined as a vertical control signal transmission period.

A transmission HSync is used as a signal for defining a period of a single line, and a period from the transmission HSync signal to the next transmission HSync is the period of a single line. Regarding a transmission HSync, by using information such as the HSync period, the horizontal front porch period, the horizontal active period, and the horizontal back porch period which are defined by the image format, it is possible to calculate and generate a leading pixel of the active image in the image format with HSync as a trigger. A period that corresponds to a number of horizontal pixels in the active image from the transmission HSync is defined as a horizontal image signal transmission period, and a period thereafter is defined as a horizontal control signal transmission period.

By performing a transmission of active image data during the vertical image signal transmission period and the horizontal image signal transmission period and by performing transmission of a control command or other data during a vertical control signal transmission period or a horizontal control signal transmission period, display image data transmission processing is given highest priority, so that low latency can be achieved.

Also, in the image processing system according to the present embodiment, the data enabling signal omitted in the above description can be used to decide the vertical and horizontal image signal transmission periods.

An addition of control information of the image processing system in the second embodiment will be described with reference to FIGS. 12A and 12B.

Figure 12A:
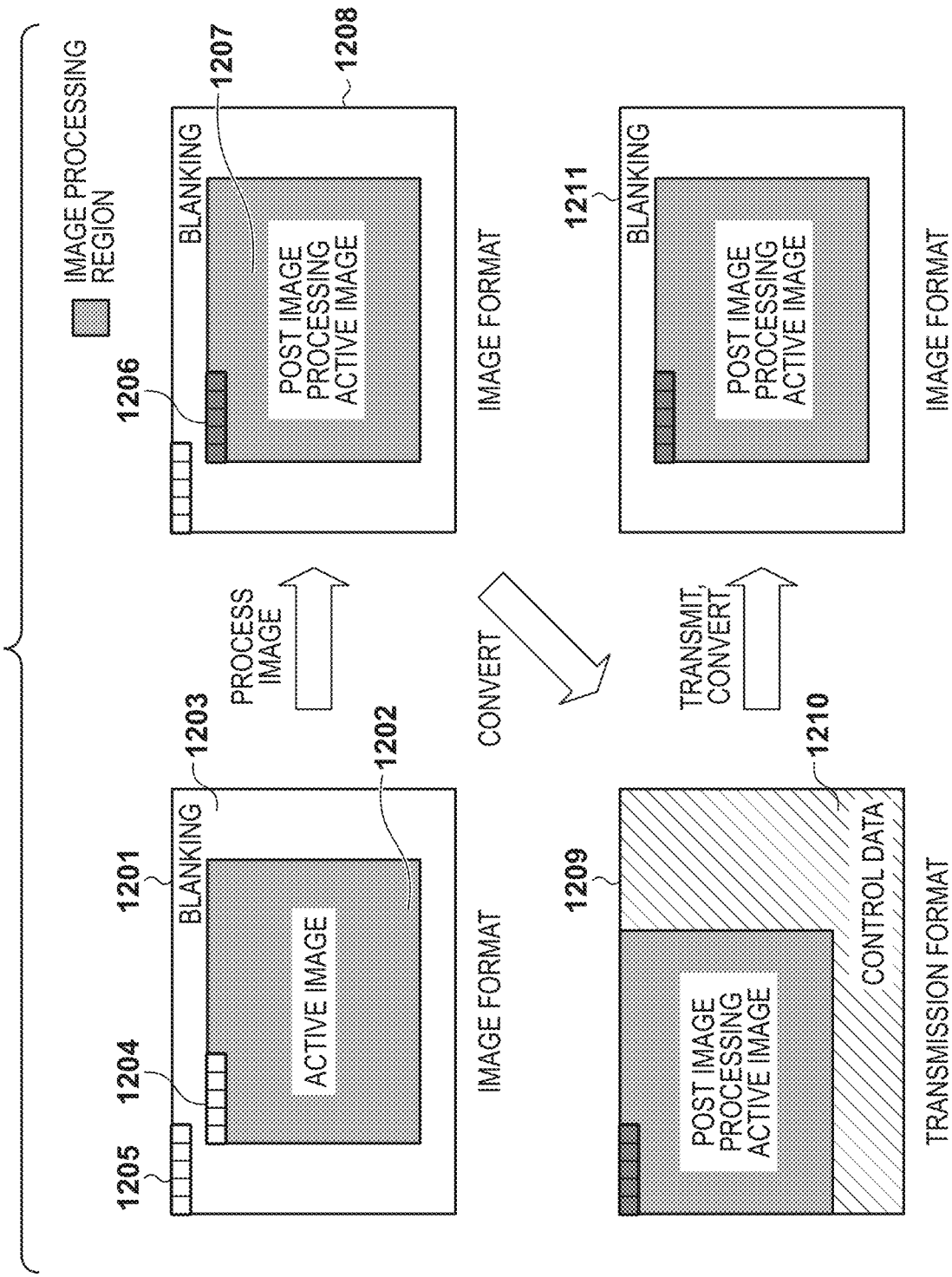
FIGS. 12A and 12B are views describing addition of control information of the image processing system in the second embodiment.

FIG. 12A is a view for describing the addition of control information in a case where the image processing is performed in relation to the entire active image region.

Display image data 1201 is image data based on a defined image format comprising an active image region 1202 and a blanking region 1203. Here, an example in which added control information 1204 and added control information 1205 are added respectively inside the active image region 1202 and inside the blanking region of the display image data 1201 will be explained. The active image region 1202 of this display image data 1201, because the image processing is performed in the display image processing unit 608 of the image processing apparatus 104, changes to a post image processing active image region 1207. At this time, the added control information 1204 that has been added inside the active image region 1202, is affected by the image processing and changes into added control information 1206 which is different from the original information.

Post image processing image data 1208, when transmitted by the apparatus-side I/F 603 of the image processing apparatus 104, undergoes a format conversion into transmission image data 1209 based on the defined transmission format. At this time, the added control information 1205 added inside the blanking region 1203 of the image data 1201 is overwritten by the image data within the post image processing active image region 1207 comprising a control command and other data and thereby is lost.

The transmission image data 1209, after it was transmitted to the HMD 101 via the HMD-side I/F 602, goes through the format conversion once again and is converted into display image data 1211 based on the image format so that it can be displayed by the display device 303.

The display control unit 901 of the HMD 101 performs the control of the display unit 32 based on the added control information added to the display image data 1211. However, in a case where the added control information 1204 is added inside the active pixel region of the display image data 1201, because of the effect of image processing, it is changed to the added control information 1206 which is different from the original control information, and therefore, the display control unit 901 cannot properly perform the control of the display unit 32. Also, in a case where the added control information 1205 is added inside the blanking region of the display image data 1201, because the added control information is lost when converting to the transmission format, similarly, the control of the display unit 32 cannot be performed in the display control unit 901.

Figure 12B:
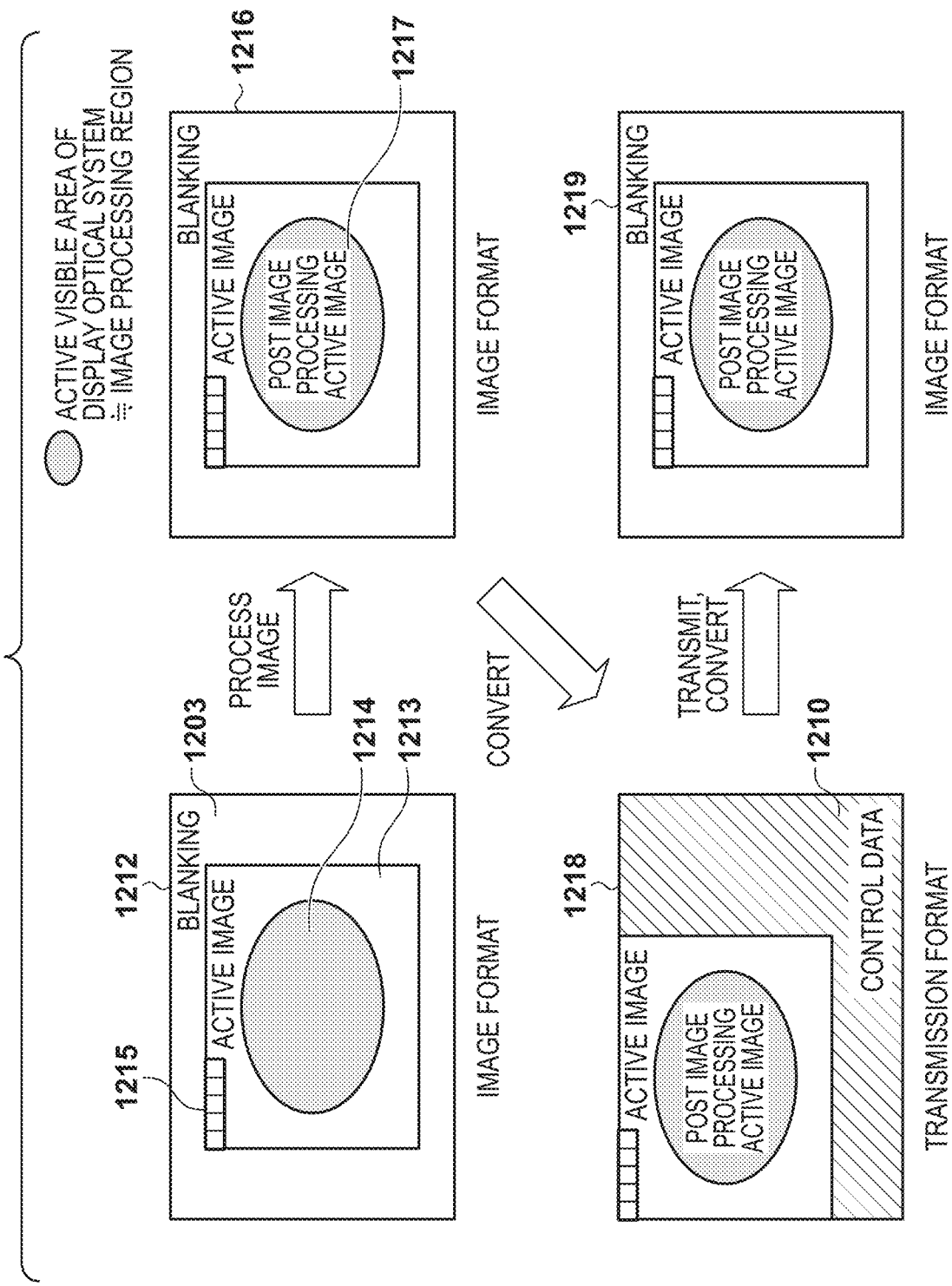

FIG. 12B is a view explaining an aspect of the image processing system in the present embodiment, which is the adding of the control information in a case where the image processing is not performed for what is outside the active visible area of the display optical system or where processing different than that of what is inside the active visible area is performed.

Display image data 1212 is image data based on a defined image format comprising an active image region 1213 and the blanking region 1203. An active image region 1213 comprises an active visible area 1214 of the display optical system. Here, because the case where the added control information is added to the blanking region 1203 of the display image data 1212 is the same as FIG. 12A, description thereof will be omitted, and an example in which the added control information 1215 is added inside the active image region of the display image data 1212 and outside the active visible area of the display optical system will be explained.

The active visible area 1214 of the display optical system inside the active image region 1213 of the display image data 1212, by the image processing performed in the display image processing unit 608 of the image processing apparatus 104, is replaced with a post image processing active image region 1217. At this time, the image processing is not performed in relation to a position of the added control information 1215 added outside the active visible area 1217 of the display optical system, therefore the added control information 1215 does not receive the effects of the image processing, and the original information is maintained.

Post image processing image data 1216, when transmitted by the apparatus-side I/F 603 of the image processing apparatus 104, undergoes a format conversion into transmission image data 1218 based on the defined transmission format. At this time, because the added control information 1215 is positioned inside the active image region 1213, it will not be lost by being overwritten by control data 1210 comprising a control command and other data.

The transmission image data 1218, after it was transmitted to the HMD 101 via the HMD-side I/F 602, goes through the format conversion once again and is converted into display image data 1219 based on the image format so that it can be displayed by the display device 303.

In the display control unit 901 of the HMD 101, it becomes possible to perform the control of the display unit 32 based on the added control information 1215 added to the display image data 1219.

Note that in the above, a configuration in which the image processing is performed only on the active visible area 1214 of the display optical system inside the active image region 1213 of the display image data 1212 was explained, however, limitation is not made to the image processing range of the image processing system in the present embodiment. For example, as explained in the first embodiment, different image processing may be performed outside the active visible area 1214 of the display optical system. In such a case, by setting so as not to perform the image processing on the position where the added control information 1215 has been added, it becomes possible to avoid the added control information from changing due to the image processing.

As described above, according to the image processing system in the second embodiment of the present invention, similarly to the image processing system in the first embodiment, by not performing the image processing outside the active visible area of the display optical system or by performing processing that is different from the processing inside the active visible area, the memory amount required for the image processing or the image processing load can be reduced, thereby achieving cost reduction and power saving.

Also, because in the course of the image processing, a format is not changed to a special image format, it is not necessary to use dedicated hardware that is compatible with the special image format or to an add processing for conversion into a general image format. Therefore, a general-purpose display panel or image processor can be employed, and it becomes possible to, without leading to an increase in cost of the entire image processing system, reduce cost by reducing the memory amount and reducing the image processing load, and attain a power saving effect.

Furthermore, by embedding the added control information outside the active visible area of the display optical system and inside the active image region of the display image data, the loss of the added control information when converting to the transmission format can be avoided and the added control information being changed due to the image processing can be avoided.

Also, in the image processing system according to the first and second embodiments, an explanation of the display image processing was given, however, the same processing can be applied to the captured image processing. That is, by not performing the captured image processing with respect to the outside of the active visible area of the display optical system or by performing processing that is different from the processing inside the active visible area, it becomes possible to obtain an effect similar to the display image processing such as cost reduction and power saving.

Also, a configuration may be taken so that a parameter (zoom, sensitivity, etc) for the image capturing unit related to capturing can be embedded inside the active image region of the display image data and outside the active visible area of the display optical system as control information.

Also, although the head mounted display in the embodiment was explained to be the video see-through type, it may be an optical see-through-type.

As explained above, according to the present embodiment, by simplifying or not performing the image processing outside the active visible area of the display optical system, while still using an image format that supports a general-purpose image processor or display panel, the required memory amount for the image processing and the image processing load can be reduced and power saving can be achieved.

Also, when adding the control information outside the active visible area of the display optical system in the image data, it becomes possible to prevent the control information itself changing due to the image processing or the loss of the control information due to the data transmission.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-158929, filed Aug. 30, 2019, which is hereby incorporated by reference herein in its entirety.

What is claimed is:

1. An image processing apparatus configured to communicate with a display apparatus, which comprises a display device and an optical system for imaging an image displayed on the display device, the image processing apparatus comprising:
   one or more processors; and
   one or more memories coupled to the one or more processors, the one or more memories having stored thereon instructions which, when executed by the one or more processors, cause the image processing apparatus to:
      generate image data for displaying on the display device;
      add control information for the display apparatus to the generated image data outside a visible area of the optical system; and
      perform image processing in relation to the generated image data inside the visible area of the optical system.

2. The image processing apparatus according to claim 1, wherein the generated image data outside the visible area is treated as not subject to image processing.

3. The image processing apparatus according to claim 1, wherein different image processing is performed in relation to image data outside of the visible area from that in relation to image data inside the visible area.

4. The image processing apparatus according to claim 1, wherein the control information is information for achieving a synchronization of a display in the display apparatus.

5. The image processing apparatus according to claim 1, wherein
   the display apparatus further comprises an image capturing unit; and
   the control information is information for controlling the image capturing unit.

6. The image processing apparatus according to claim 1, wherein
   in the image processing, a position to which the control information has been added is treated as not subject to image processing.

7. The image processing apparatus according to claim 1, wherein the instructions, when executed by the one or more processors, further cause the image processing apparatus to adjust a size and position of the visible area.

8. The image processing apparatus according to claim 1, wherein image data comprising a virtual object is generated, as the generated image data, based on a position and orientation of the display apparatus.

9. The image processing apparatus according to claim 8, wherein
   the display apparatus further comprises an image capturing unit; and
   image data to which the virtual object is composited is generated in relation to an image captured by the image capturing unit based on the position and orientation of the display apparatus.

10. The image processing apparatus according to claim 9, wherein the instructions, when executed by the one or more processors, further cause the image processing apparatus to calculate a position and orientation of the display apparatus, and
    wherein the virtual object and an image captured by the image capturing unit are composed based on the calculated position and orientation of the display apparatus.

11. The image processing apparatus according to claim 10, wherein
    the display apparatus further comprises a position and orientation sensor; and
    the position and orientation of the display apparatus is calculated based on a measurement value of the position and orientation sensor.

12. The image processing apparatus according to claim 1, wherein the image processing is a correction of a deterioration of image quality by the optical system.

13. The image processing apparatus according to claim 12, wherein the deterioration of the image quality is a distortion by the optical system.

14. The image processing apparatus according to claim 4, wherein a correction is performed by distorting image data inside the visible area in an opposite direction of the distortion of the optical system.

15. The image processing apparatus according to claim 12, wherein the deterioration of the image quality is a decrease in an amount of light in a peripheral area of the optical system.

16. The image processing apparatus according to claim 15, wherein a shading correction is performed for image data inside the visible area of the optical system, by compensating for the decrease in the amount of light.

17. The image processing apparatus according to claim 16, wherein in the image processing, a tone of image data outside the visible area is lowered.

18. A method of controlling an image processing apparatus configured to communicate with a display apparatus, which comprises a display device and an optical system for imaging an image displayed on the display device, the method comprising:
    generating image data for displaying on the display device;
    adding control information for the display apparatus to the generated image data outside a visible area of the optical system; and
    performing image processing in relation to the generated image data inside the visible area of the optical system.

19. A non-transitory computer-readable storage medium storing a program which, when read and executed by a computer, causes the computer to execute steps of a method of controlling an image processing apparatus configured to communicate with a display apparatus, which comprises a display device and an optical system for imaging an image displayed on the display device, the method comprising:

generating image data for displaying on the display device;

adding control information for the display apparatus to the generated image data outside a visible area of the optical system; and performing image processing in relation to the generated image data inside the visible area of the optical system.

20. A system comprising:

a display apparatus comprising a display device and an optical system configured to image an image displayed on the display device; and an image processing apparatus configured to generate image data for display on the display device of the display apparatus, the image processing apparatus comprising:

one or more processors; and one or more memories coupled to the one or more processors, the one or more memories having stored thereon instructions which, when executed by the one or more processors, cause the image processing apparatus to:

generate image data for displaying on the display device;

add control information for the display apparatus to the generated image data outside a visible area of the optical system; and perform image processing in relation to the generated image data inside the visible area of the optical system.

* * * * *